United States Patent [19]

Carasso et al.

[11] Patent Number: 5,682,365
[45] Date of Patent: Oct. 28, 1997

[54] APPARATUS FOR RECORDING DATA ON A DISC-SHAPED OPTICALLY READABLE RECORD CARRIER

[75] Inventors: Marino Giuseppe Carasso; Johannes Jacobus Verboom, both of Eindhoven, Netherlands

[73] Assignee: U.S. Philips Corporation, New York, N.Y.

[21] Appl. No.: 375,620

[22] Filed: Jul. 25, 1989

Related U.S. Application Data

[63] Continuation of Ser. No. 110,063, Oct. 8, 1987, abandoned, which is a continuation of Ser. No. 134,392, Mar. 26, 1980, abandoned.

[30] Foreign Application Priority Data

Jan. 9, 1980 [NL] Netherlands .................. 8000121

[51] Int. Cl.⁶ .................................................. G11B 7/00
[52] U.S. Cl. .................. 369/54; 369/58; 369/59; 369/44.13; 369/48
[58] Field of Search .............. 369/44.13, 275.1–275.4, 369/59, 54, 58, 48

[56] References Cited

U.S. PATENT DOCUMENTS

| | | | |
|---|---|---|---|
| 3,946,367 | 3/1976 | Wohlmut et al. | 369/94 |
| 3,962,720 | 6/1976 | Boaat | 369/44.13 |
| 3,999,008 | 12/1976 | Bauwhuis et al. | 369/275.4 |
| 4,025,731 | 5/1977 | Rembault | 369/103 |
| 4,027,330 | 5/1977 | Maslowski et al. | 369/279 |
| 4,067,044 | 1/1978 | Maeda et al. | 369/44.13 |
| 4,094,010 | 6/1978 | Pepperl et al. | 369/33 |
| 4,094,013 | 6/1978 | Hill et al. | 369/33 |
| 4,142,209 | 2/1979 | Hedlund et al. | 365/234 |
| 4,229,808 | 10/1980 | Hui | 358/128.5 |
| 4,238,843 | 12/1980 | Carasso et al. | 358/128.5 |
| 4,290,122 | 9/1981 | Bates et al. | 369/59 |
| 4,331,976 | 5/1982 | Kinjo et al. | 369/275.3 |
| 4,366,564 | 12/1982 | de Haan et al. | 369/59 |
| 4,392,219 | 7/1983 | Yokozawa et al. | 369/277 |
| 4,839,882 | 6/1989 | Janssen | 369/275.1 |
| 4,972,401 | 11/1990 | Carasso et al. | 369/59 |

OTHER PUBLICATIONS

Comstock et al., "Servo Disk with Overlapping Servo and Data Tracks", IBM TDB, vol. 16, No. 6 Nov. 1973, p. 1818.

*Primary Examiner*—Nabil Hindi
*Attorney, Agent, or Firm*—Leroy Eason

[57] ABSTRACT

Disclosed is a record carrier for optically detectable data storage, apparatus for manufacturing such a record carrier and apparatus for recording and/or reproducing information on such a record carrier. The record carrier is provided with periodic track variations whose period corresponds to a frequency for which the power spectrum of the digitally coded information substantially exhibits a zero point. When scanned by a beam of radiation, the periodic track variations produce periodic modulation in the beam of a frequency corresponding to the period of the track variations in order to generate a clock signal of a frequency equal to the bit frequency during recording or reproduction.

5 Claims, 8 Drawing Sheets

APPARATUS FOR RECORDING DATA ON A DISC-SHAPED OPTICALLY READABLE RECORD CARRIER

This is a continuation of application Ser. No. 110,063 filed Oct. 8, 1987, which is a continuation of application Ser. No. 134,392, filed Mar. 26, 1980, both now abandoned.

The invention relates to a record carrier comprising a disc-shaped substrate with a radiation-sensitive information layer. The record carrier is provided with information areas arranged in a spiral or concentric track pattern and is intended for recording and/or reproduction, via a radiation beam, of digitally coded information having a fixed bit frequency in the information areas.

The invention further relates to an apparatus for manufacturing such a record carrier in which the track pattern is inscribed by a radiation beam before the information layer is applied.

The invention also relates to an apparatus for recording information on such a record carrier comprising a light source and an optical system for directing a light beam to the information areas of such record carrier, a recording circuit for modulating the light beam depending on the digital signal to be recorded, and an optical system comprising a detector for detection of radiation which is reflected or transmitted by the record carrier.

The invention also relates to an apparatus for reading such a record carrier, in whose information areas digital information has been recorded, by means of a light beam which scans the information areas. The apparatus comprises an optical system and a detector for detecting the radiation reflected or transmitted by the recording areas and a read circuit for extracting the digital information signal from the detected radiation.

A record carrier of the type mentioned in the preamble as well as apparatus for recording and/or reading information on and/or from such a record carrier, is disclosed Netherlands Patent Application No. 7802859 which has been laid open to public inspection, and corresponds to U.S application Ser. No. 140,409, filed Apr. 14, 1980. In the record carrier described in that application, the information areas alternate with synchronization areas each containing the address of the information area that follows such a synchronization area. When such a record carrier is used the clock generation is intricate and sometimes not very reliable. During reading it is possible, though intricate, to a clock signal from a recorded data signal and from the information signals contained in the synchronization areas. When the data signal is written in the information area, the clock generation is even more intricate, because then only the information contained in the synchronization areas is available. In that case a clock generator may be used which, during reading of the synchronization areas, can be synchronized with the information contained in the synchronization areas by means of a phase-locked loop. Apart from its complexity, such an arrangement has the additional drawback in that at the beginning of each synchronization area the phase-locked loop must be looked in again. The synchronism of the record carrier motion of the process of recording data in the information areas is not reliable, so that not every information area is utilized up to the end because space is to be reserved in order to allow for the effect of possible speed variations of the record carrier and of the information recording process as a result of the drift of the clock generator frequency, In the Patent Application it has, therefore, been proposed to include additional synchronization areas in the information areas, which mitigates the above problems but does not eliminate them and which reduces the information storage capacity of the record carrier. In record carriers in which no synchronization areas are employed between the information areas, such as for example record carriers for recording digitally coded audio signals, the clock generation is even more intricate.

It is the object of the invention to provide a record carrier of the type mentioned in the preamble which does not present the above problems. The invention is embodied in the record carrier, the apparatus for manufacturing said record carrier, the apparatus for recording information on said record carrier, and the apparatus for reproducing information which has been recorded in the information areas of such a record carrier.

The record carrier in accordance with the invention is characterized in that the information areas have periodic variations or track modulation, whose period corresponds to a frequency at which the power spectrum of the digitally coded information to be recorded, or recorded at least substantially, exhibits a zero point, for generating a clock signal of bit frequency for synchronization of the digitally coded information during recording and/or reproduction.

The invention is based on the recognition that in the case of digital recording it is possible to prerecord a frequency which is in synchronism with the bit frequency of the data signal to be recorded on the record carrier, which frequency can be detected, both during information reading and writing, without any significant interference with said data signal and without loss of storage capacity, so that a correctly synchronized and reliable clock signal is always available.

A preferred embodiment of a record carrier in accordance with the invention may be characterized in that the digitally coded information to be recorded is coded in accordance with a modulation whose power spectrum exhibits a zero point at the bit frequency and that the period of the periodic track modulation corresponds to the bit frequency.

In this embodiment, the period of the track modulation corresponds to the actual bit frequency without the occurrence of interference.

Preferably, the track modulation in accordance with the invention is also employed for reading the synchronization areas.

To this end a record carrier in accordance with the invention is characterized in that the information areas are spaced from each other by synchronization areas, both types of areas exhibiting the periodic track modulation, and that the period of the periodic track modulation corresponds to a frequency for which the digital information contained in the synchronization areas substantially exhibits a zero point in the spectrum.

Suitably, this embodiment is further characterized in that in the synchronization areas information is recorded in accordance with a digital modulation whose power spectrum exhibits a zero point at the bit frequency and that the frequency corresponding to the period of the periodic track modulation is equal to the bit frequency of said modulation.

In respect of the nature of the periodic track modulations in the record carrier in accordance with the invention, the information areas containing a continuous servo track, may further be characterized in that the track modulation is constituted by a track-width modulation of the servo track.

An alternative embodiment of such a record carrier may be characterized in that the track modulation is constituted by a periodic radial modulation of the servo track.

In respect of the nature of the periodic track modulation, another embodiment of a record carrier in accordance with the invention may be characterized in that the track modulation is constituted by an optically detectable track-depth modulation.

This embodiment may further be characterized in that the track-depth modulation extends between the surface of said record carrier and a level situated below said surface.

In combination with a method of obtaining a radial tracking signal, the record carrier in accordance with the invention may further be characterized in that the track modulation is superimposed on a radial undulation having a wavelength which is long relative to the period of said modulation.

An apparatus for manufacturing a record carrier in accordance with the invention may be characterized by a modulation device for modulating the radiation beam in order to obtain the periodic track modulation.

In respect of the nature of the modulation of the radiation beam, a first embodiment of this apparatus is further characterized in that said modulation device is an intensity modulator.

In this respect a second embodiment is further characterized in that said modulation device is a focusing modulator for modulating the diameter of the radiation beam at the surface of the record carrier.

In this respect a third embodiment is further characterized in that said modulation device is adapted to make the radiation beam oscillate in a radial direction at the surface of the record carrier.

An apparatus for recording information on a record carrier in accordance with the invention is provided with a light source, an optical system for directing a light beam to the information areas of said record carrier, a recording circuit for modulating the light beam depending on the digital signal to be recorded, and an optical system with a detector for detecting the radiation which is reflected or transmitted by the record carrier. The apparatus further includes a band pass filter for filtering a signal of a frequency determined by the period of the periodic track modulation out of the detected radiation. That signal is then applied to the write circuit as a clock signal for synchronizing the information signal to be recorded with the periodic track modulation, so that the information to be recorded is recorded in a fixed phase relationship with said periodic track modulation.

A preferred embodiment of this apparatus includes optical means for directing a light beam modulated with information to be recorded to the information areas and for directing an auxiliary beam to the information areas behind the modulated beam for reading the information recorded by the modulated light beam. The auxiliary beam for reading the periodic track modulation is used for generating the clock signal in order to synchronize the information recording process with the other beam.

An apparatus for reading a record carrier of the invention, in whose information areas digital information is recorded, comprises an optical system for scanning said information areas with a light beam, a detector for detecting the radiation reflected or transmitted by said information areas, and a read circuit for extracting the recorded information signal from the detected radiation. In accordance with the invention, the apparatus includes a band pass filter for filtering a signal of a frequency determined by the periodic track modulation out of the detected radiation, which signal is applied to the read circuit as a clock signal for synchronization during read-out of the recorded digital information.

The invention will be described in more detail with reference to the drawing, in which:

FIG. 1 shows an embodiment of a record carrier to which the inventive principle may be applied, FIG. 1a being a plan view of the record carrier, FIG. 1b showing a part of a track 4 of said record carrier at an enlarged scale, and FIG. 1c showing, at an enlarged scale, a synchronization area shown in FIG. 1b.

FIG. 2 shows a small part of the cross-section taken on the line II-II' in FIG 1a.

FIG. 6 in FIG. 6a schematically represents an apparatus for manufacturing a record carrier in accordance with FIG. 3c, FIG. 6b schematically represents an apparatus for recording information in the record carrier of FIG. 3c.

FIG. 10 shows a variant of the apparatus of FIG. 9a,

Figure 1A:
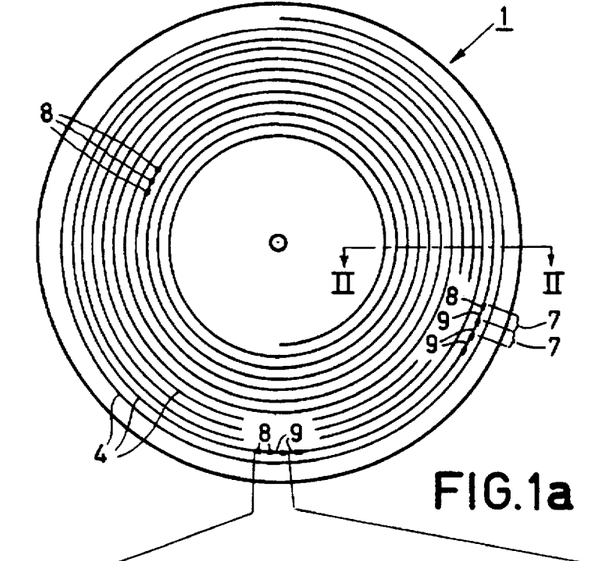
Figure 1B:
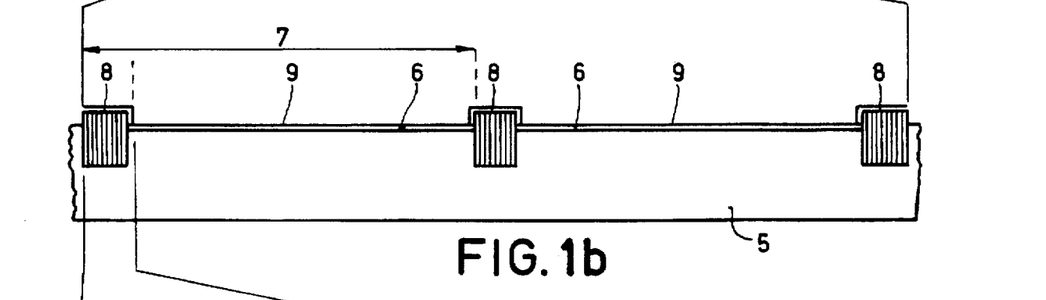
Figure 1C:
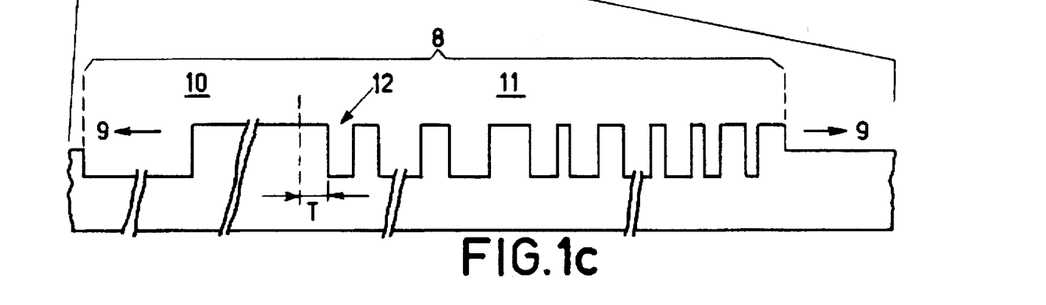

As shown in FIGS. 1a to 1c, the record carrier body 1 has a substrate 5 which is provided with a spiral track 4. This track 4 is divided into a multitude of sectors 7, for example 128 per revolution. Each sector 7 comprises an information area 9, intended for recording digitally coded information, and a synchronization area 8.

In order to ensure that the digital information is recorded in an accurately defined path, the track 4 is employed as servo track. For this purpose the information areas 9 of the sectors 7 exhibit an amplitude structure, as shown in FIG. 2.

Figure 2:
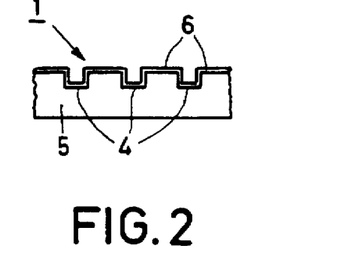

FIG. 2 shows a small part of the cross-section taken on the line II-II' in FIG. 1a and thus shows a number of adjacent track portions, specifically information areas, of the servo track 4. The direction of the servo tracks 4 is thus perpendicular to the plane of drawing. The servo tracks 4, in particular the information areas 9, thus take the form of grooves in the substrate 5. In this way it is possible to make a radiation beam, which is directed at the record carrier in order to record digital information, accurately coincide with said servo track 4, in other words to control the position of the radiation beam in a radial direction via a servo system which employs light reflected by the record carrier. The measurement of the radial position of the radiation spot on the record carrier may be in accordance with systems similar to those employed in optical record carriers provided with a video signal and as inter alia described in "I.E.E.E. Transactions on consumer electronics", November 1976, page 307.

For recording of digital information, the record carrier body is provided with a layer of a material 6 which, if exposed to suitable radiation, is subject to an optically detectable change. In principle, only the information portions 9 of the sectors need be provided with such a layer. However, for reasons of manufacturing technology it is simpler to provide the entire record carrier surface with such a layer. This layer 6 may, for example, comprise a thin layer of a metal, such as tellurium. This metal layer can be melted locally by laser radiation of sufficiently high intensity, so that locally this information layer 6 is given a different reflection coefficient, as a result of which the reflected radiation beam is amplitude-modulated in accordance with the recorded information when an information track thus inscribed is scanned by a read beam.

Alternatively, the layer 6 may take the form of a double layer of materials, for example aluminium on iron, which react chemically to incident radiation. At the location where a high-power radiation beam is incident on the disc, $FeAl_6$ is formed, which is a poor reflector. A similar effect is obtained in the case of a double layer of bismuth on tellurium, $Bi_2Te_3$ being formed. It is also possible to employ a single layer of tellurium.

Since, with the aid of the servo track in the form of e groove in the substrate 5, the write radiation spot is made to coincide accurately with said servo track, in particular when an information area is being scanned, the digital information modulating the write beam is recorded exactly in the information area coinciding with said servo track.

As is apparent from the foregoing the record carriers intended for the user, in which the information areas do not yet contain information, have a groove structure in the information areas within the sectors. Moreover, within each sector such a record carrier has a synchronization area 8 in the form of an optically detectable relief structure. FIG. 1b on an enlarged scale shows a part of a track 4, from which the sequence of a number of information areas 9 and synchronization areas 8 is apparent. In this case the synchronization areas 8 have a relief structure constituted by a sequence of recesses alternating with intermediate areas.

The depth of the recesses in this structure of the synchronization area is greater than the depth of the servo track in the information area 9. This depth of the recesses is selected in accordance with general optical rules and depending on the shape of said recesses in the selected read system in such way that an optimum read-out of the information represented by the structure is obtained. In the case of a read system in which the radiation beam reflected by the record carrier is detected by a single photo-detector, ¼ λ may be selected as the depth for the recesses, λ being the wavelength of the radiation used. If the depth of the servo track in the information area 9 is made ⅛ λ or less, this servo track will hardly affect the amount of light detected by the detector.

In order to further illustrate the structure of the synchronization area, FIG. 1c again shows such a synchronization area on an enlarged scale, the information layer 6 being omitted for the sake of simplicity. Such a synchronization area 8 comprises two portions, namely an indication portion 10 and an address portion 11. The address portion 11 contains all the information required for controlling the recording process. When recording digital information, this information is converted into a so-called word-organized bit series. This address portion contains information about the word organization, so that during recording the location of the bit words is defined and during reading the bit words are suitably decoded. Furthermore, this address portion 11 contains information about the relevant track number. This information takes the form of a relief structure in accordance with a digital modulation technique suitable for the recording medium. Since, in addition to the servo track in the form of a groove in the information portions 9, the record carrier therefore in the synchronization area already contains all the information required for positioning information in the form of a bit-word-organized bit series in said information areas, the requirements imposed on the write and read apparatus employed by the user may be less stringent. Furthermore since this fully prerecorded information is formed in the record carrier as a relief structure, the record carrier is particularly suitable for mass-production, enabling the customary pressing techniques to be used.

Figure 3A:
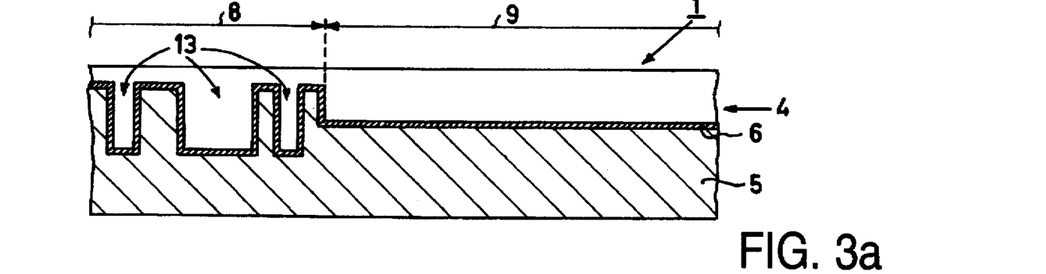
FIGS. 3a through 3d, schematically show a cross-section in the longitudinal direction through a part of the track 4, FIG. 3a showing such a cross-section for a blank disc prepared in accordance with a known technology, FIG. 3b showing said cross-section of FIG. 3a after information has been recorded in the information area 9, FIG. 3c showing such a cross-section of a blank prepared disc in accordance with the invention, FIG. 3d showing the cross-section of FIG. 3c after digital information has been recorded, FIG. 3e schematically representing the signal obtained when reading the part of the track 4 shown in cross-section in FIG. 3d, and FIG. 3f schematically representing a plan view of a part of the track 4 after digital information has been recorded in a manner other than in FIGS. 3b and 3d.
Figure 3B:
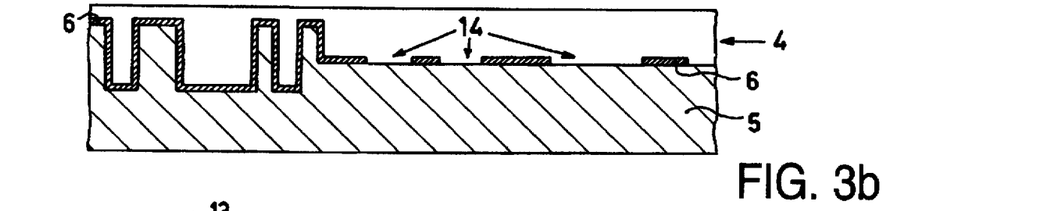
Figure 3C:
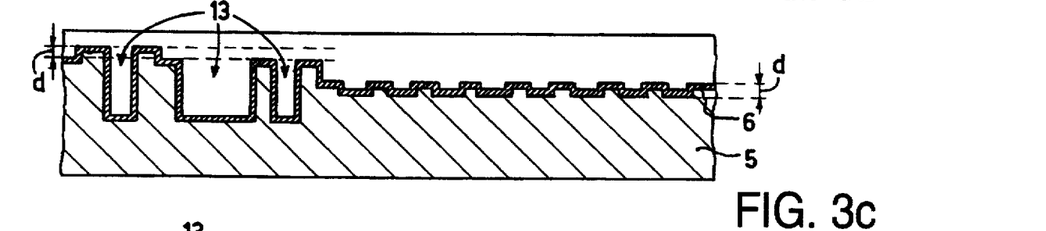
Figure 3D:
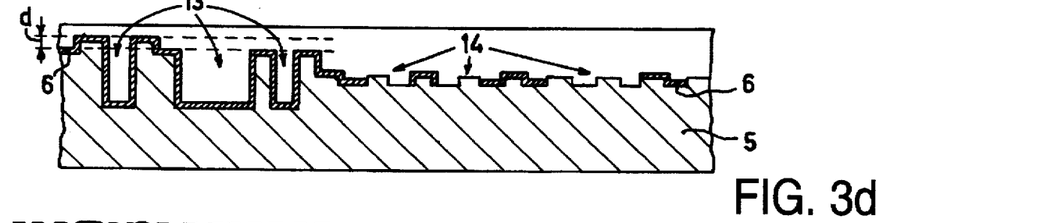
Figure 3E:
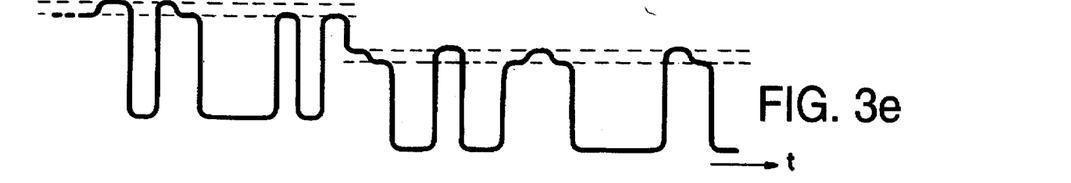
Figure 3F:
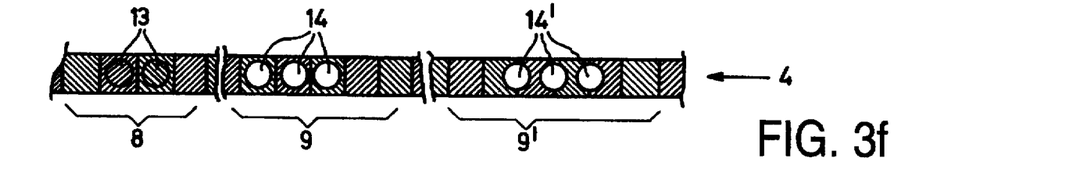

FIGS. 3a through 3d schematically represent a part of such a servo track 4 in a cross-section in the longitudinal direction of the servo tracks 4 with a part of the synchronization area 8 and a part of the information area 9, FIG. 3a showing such a cross-section of a blank prepared disc using a known technique, FIG. 3b showing such a cross-section after digital information 14 has been recorded in the information area 9, FIG. 3c showing such a cross-section of a blank prepared disc provided with clock information in accordance with the invention, and FIG. 3d representing the cross-section of FIG. 3c after information 14 has been recorded in the information area 9. FIG. 3e schematically represents the signal obtained when reading the part of the track 4 shown in cross-section in FIG. 3d and FIG. 3f schematically shows a plan view of a part of the track 4 after information has been recorded in a manner other than represented in FIGS. 3b and 3d.

The prepared disc is provided with a servo track 4, formed in a substrate 5, for example, by means of a laser beam. By modulating the intensity of the laser beam it is then possible to form a relief structure of "pits" 13 containing information in the synchronization area 8. Subsequently, the entire disc, including, or the sake of simplicity, the portion of the record carrier 1 outside the grooves 4 may then be coated with the reflecting information layer 6. In the record carrier thus prepared information can be recorded in the information area 9 by forming holes 14 in the reflecting information layer 6, for example by means of a laser beam. Such an inscribed record carrier is shown in FIG. 3b. When information is written, i.e. the holes 14 are formed, and when the information is read, for example by means of a laser beam, it is of importance that this information writing or reading process is synchronized with the aid of a clock signal, about which the synchronization areas 8 may contain information. In order to ensure that during writing and reading a suitable synchronous clock signal is available continuously, i.e. during writing or reading in the information areas 9, the servo groove 4 is, in accordance with the invention, provided with structure which produces a modulation of the light reflected by the information carrier when the servo track 4 is followed during reading or writing.

Figure 4:
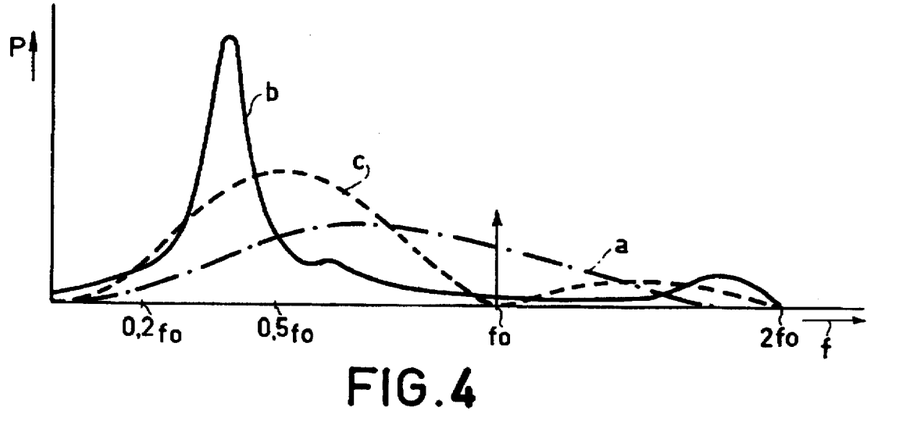
FIG. 4 shows the random power spectra of three digital information signal modulations.

However, this structure should be such that it does not disturb the read-out of information. How this is done is explained with reference to FIGS. 4 and 5, FIG. 4 representing the random power spectra of three possible binary information-signal modulations and FIG. 5 being a diagrammatic representation of said modulations.

Figure 5A:
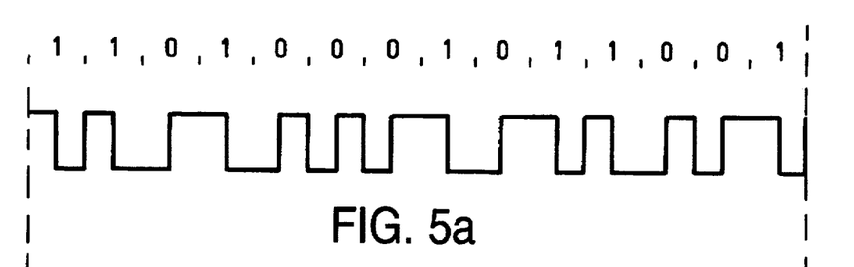
FIG. 5 is a diagrammatic representation of said modulations.

FIG. 5a illustrates a modulation known by the name of "biphase" modulation. The applied digital signal is converted into a binary signal such that a logic "one" of the applied digital signal is positive during the time interval T/2 and negative during the next time interval T/2, T being the bit length of the applied digital signal. A logic "zero" yields exactly the opposite binary signal, i.e. negative for the time interval T/2 and positive for the next time interval T/2. This modulation technique yields a binary signal which has a power spectrum represented by a in FIG. 4. The frequency fo then corresponds to 1/T.

Figure 5B:
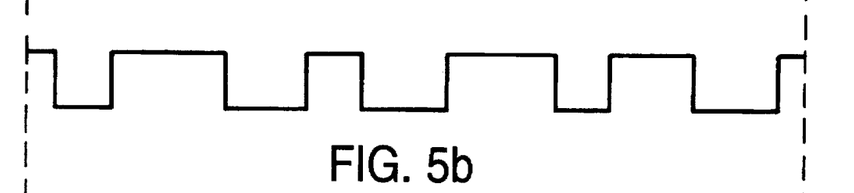

FIG. 5b represents the modulation known by the name of "Miller" modulation. The binary signal generated by means of this modulation has a transition halfway a logic "one" of the "zeros". The frequency spectrum of the binary signal obtained by means of this modulation technique has the designation b in FIG. 4.

Figure 5C:
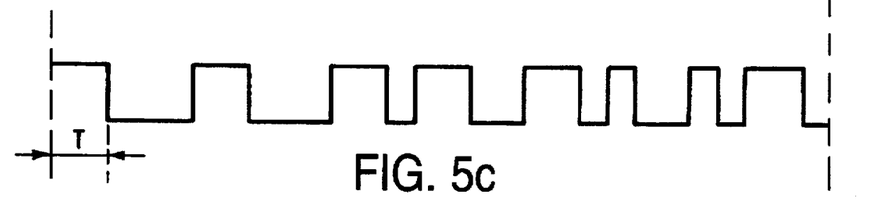

Finally, FIG. 5c represents a modulation known by the name of "quadphase" modulation in which the applied bit series of the digital signal is first divided into consecutive groups of two bits. From each two-bit group having a duration of 2 T, a binary signal is derived which in a first time interval T has the same variation as the original two bits and in the next time interval T an inverse variation. The possible bit combinations 11, 00, 01 and 10 are thus converted into the bit combinations 1100, 0011, 0110 and 1101, respectively. The binary signal obtained by means of this modulation technique has a frequency spectrum represented by c in FIG. 4.

It is evident from FIG. 4 that these modulation techniques have the common property in that the resulting binary signal exhibits no strong frequency components at comparatively low frequencies, for example frequencies below 0.2 fo. This is very useful when an optical record carrier is used with the associated write and read systems. As stated previously, such systems employ both a servo control in order to keep the scanning spot accurately focussed on the record carrier and a servo control which controls the radial position of the scanning spot and ensures that the scanning spot accurately coincides with the information track. Since the control signals required for these servo controls are derived from the radiation beam which is reflected by the record carrier, which is also modulated by the relief structure of the synchronization area, it is essential that the frequency spectrum of the binary signal stored in the address portion does not contain any strong frequency components within the frequency band intended for the control signals. FIG. 4 thus shows that the frequency band below approximately 0.2 fo is suitable for such control signals. The control signals for the servo systems may, for example, extend to a maximum frequency of 15 kHz. If, for example, the value 500 kHz is selected for the frequency fo=1/T, will be evident from FIG. 5 that the binary signals a, b or c only exhibit very weak frequency components at frequencies of 15 kHz and lower. Furthermore, it is apparent from FIG. 4 that at the frequency 2 fo and in the case of modulation method 5c the spectrum also has zero points at the frequency fo. Thus, it is possible to provide the record carrier with a clock structure of the frequency 2 fo without interference with the information signals. Zero points at the frequency 2 fo also occur in the case of other modulation methods.

When quadphase modulation shown in FIG. 5c used and also in the case of some other modulation methods, the frequency fo is highly suitable for this purpose. The frequency fo corresponds to the bit frequency 1/T, so that this quadphase modulation becomes very attractive. Also in the case of modulation method of FIG. 5b, a structure with the frequency fo may be used in some cases because the components of the spectrum of modulation tv of FIG. 5b are comparatively small at said frequency. Furthermore, it is theoretically possible to give the structure a modulation corresponding to a frequency higher than 2 fo, but in practice this is generally not feasible. Indeed, in view of a maximum information density, the dimensions of the pits 13 and 14, which at a specific speed of rotation of the disc 1 at least correspond to a bit length of ½T, are selected nearest the resolution of the write/read system used, so that the surface structure corresponding to frequencies higher than 2 fo will hardly be detectable. By means of special modulation techniques it is also possible to obtain zero points in the power spectra at frequencies other than fo or 2 fo, for example at ½ fo.

FIG. 3c shows a cross-section of a record carrier in accordance with the invention corresponding to the cross-section of FIG.3a, whose surface at least at the location of the track 4 has been provided with a relief structure having a height d. One way of realizing this structure is to modulate the laser by means of which the synchronization area 8 and the groove 4 of the information area 9 is formed. In the present example this has only be done in the synchronization area 8 between the pits 13 by limiting the intensity or the laser beam. However, in principle it is also possible to provide the bottoms of the pits with a relief structure.

As shown in FIG. 3d, the disc in accordance with the invention can also be provided with information by forming holes 14 in the reflecting layer 6 covering the relief structure.

FIG. 3e shows an example of a signal obtained when reading a relief structure in accordance with FIG. 3d. This signal exhibits minima at the location of the pits 13 or the holes 14 and an amplitude modulation (d in FIG. 3c) corresponding to the modulation structure with the frequency fo at the maxima. The modulation structure of the bottoms of the holes 14 hardly contributes to the signal, because it hardly reflects any light owing to the removal of the reflecting layer 6. In this respect it is to be noted that it is for example also possible to provide a non-reflecting layer 6 on reflecting substrate 5, which layer is locally removed. As a result of this the modulation or the frequency fo will be read satisfactorily at the very locations 14 where the non-reflecting layer has been removed.

In FIGS. 3a–3d the pits 13 or the holes 14 are shown as continuous holes or pits, i.e. in the case of more than one bit as an elongate slot having a length corresponding to the number of consecutive bits. However, it is alternatively possible to provide a separate pit or hole for each bit. FIG. 3f illustrates this and shows a track 4 in which the clock modulation structure is represented by different types of hatching. In the synchronization area 8 the pits 13 may for example be formed in the center of the maxima or minima of the structure and are also coated with a reflecting layer 6, which is symbolized by the hatching through said pits 13. In the information portion 8 the information holes 14 may be formed in the reflecting layer 6 at the maxims and minima of, the clock information structure. Alternatively—as is represented by the information area 9 in FIG. 3f—holes 14' may be formed at the zero points of the information structure. In this respect the location of the pits 13 or holes 14 is not essential, provided that the phase relationship with the clock information structure is fixed and known. Neither is the shape of the information structure of great significance. Instead of the rectangular shape shown in FIG. 3, it may well have a sinusoidal shape, which is readily possible in the case of manufacture by means of a modulated laser beam. It is of importance only that the clock synchronization structure exhibits a frequency component which can readily be detected at the frequency fo or 2 fo and which exhibits no strong components within the spectrum of the synchronization or digital-information signal recorded or to be recorded, which is generally the case when the clock information structure d has a fundamental frequency fo or 2 fo with higher order harmonics only; the next harmonic is then 2 fo or 4 fo, which as is shown in FIG. 4 falls beyond the part of the information spectrum which is of interest.

Figure 6A:
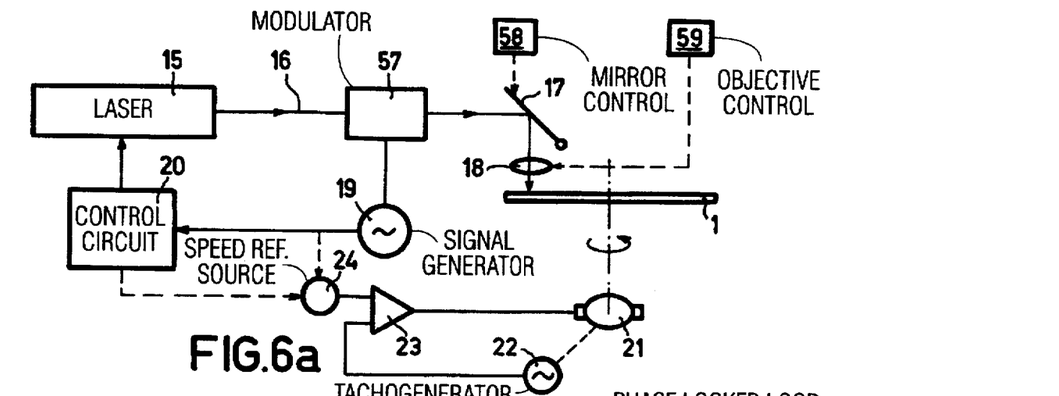
Figure 6B:
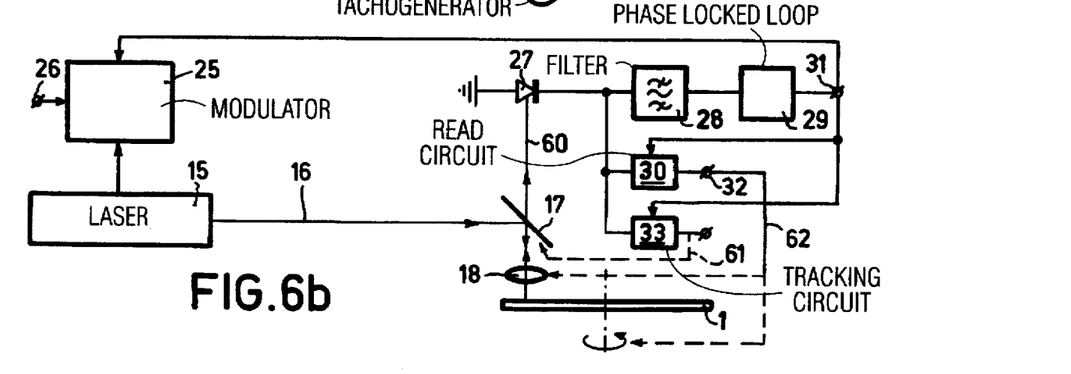
Figure 6C:
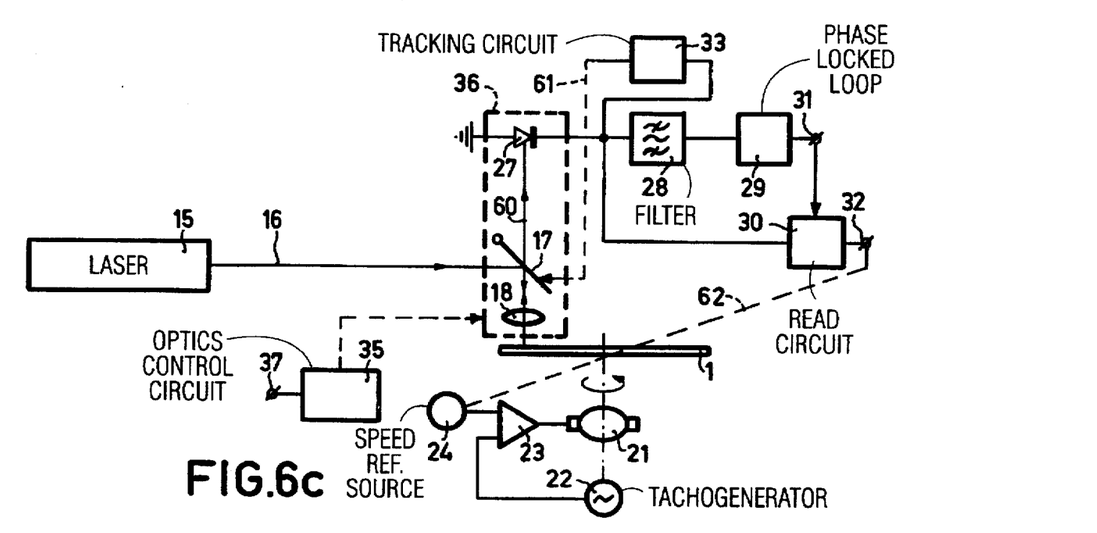
FIG. 6c represents an apparatus for reading an inscribed record carrier.

In order to illustrate how structures in accordance with FIG. 3 can be realized, FIG. 6, in this order, schematically shows in FIG. 6a an apparatus for manufacturing a record carrier in accordance with FIG. 3c, FIG. 6b an apparatus for recording information in the record carrier of FIG. 3c, and FIG. 6c an apparatus for reading such an inscribed record carrier.

In the apparatus of FIG. 6a the beam 16 from a laser 15 is projected at a rotating disc 1 via for example an intensity modulator 57, a mirror 17 and focussing optics 18, in order to form the spiral groove 4 (FIG. 1). The laser 15 is controlled by a circuit 20 for pulsating the laser 15 so as to form the pits 13 (FIG. 3) in the synchronization area 8. The modulator 57 is controlled by a source 19 having a frequency fo (or 2 fo) in order to realize a clock modulation structure in the groove 4. Alternatively, it is possible to modulate the laser itself. The disc 1 is driven by a motor 21 which for the purpose of speed control, is provided with a servo control, which may for example comprise a tachogenerator 22, a speed-reference source 24, and a servo-amplifier 23. In order to ensure that the recording areas 8 are situated at the correct locations on the disc in the track 4 and, as the case may be, to obtain a correct tangential distribution of the modulation fo on the disc, the circuit 20 and, as the case may be, the source 19 of the frequency fo may be locked to the servo control.

Furthermore, the circuit 20 is controlled by the source 19 in order to guarantee a correct phase relationship of the synchronization pits 30 with the clock modulation structure. After this process the disc 1 may be provided with the layer 6.

FIG. 6b schematically represents an apparatus for providing the prepared disc 6 with information and simultaneously reading the clock modulation structure. This apparatus comprises the rotating disc 1, and a laser 15 whose beam 16, via a semitransparent mirror 17 and focussing optics 18, is projected onto the disc 1. A reflected beam 30 is detected by means of a cell 27, for example a photodiode, and converted into an electric signal from which by means of the band-pass filter 28 the component of the frequency fo (or 2 fo) is extracted, which component is mainly produced by the clock modulation structure formed in the track 4. As the case may be, this signal may also be applied to a phase-locked loop 29, improves the filtration, which increases the constancy of the clock signal and, as the case may be, compensates for brief signal dropouts. The clock signal is then available on output 31. Data can be recorded by pulse modulation of the laser beam 16, directly by including a modulator in the beam or, as is shown in FIG. 6b, by modulating the laser 15 itself with a write modulator circuit 25, to which the information is applied via an input 26 and which is synchronized with the clock signal on output 31.

Via the light-sensitive element 27 and a read circuit 30, the information contained in the synchronization portions is recovered from the reflected beam 60 and appears on an output 32. This read circuit 30 may also be synchronized with the clock signal on output 31. Said information may be used to synchronize the circuit 25 and to locate the correct position on the disc. This information is also used in a servo control, not shown in FIG. 6b, for radially positioning the optic 18 and the mirror 17, for inscribing the desired portion of the track 4 and for controlling the drive of the disc 1, which is symbolically represented by the dashed line 62 in FIG. 6b.

Furthermore, the apparatus, may be provided with a tracking circuit 33 which derives a tracking signal from the signal supplied by the detector 27 in order to keep the beam 16 on the track 4 by controlling the angle relative to the beam 16 of the mirror 17, which is symbolized by the dashed line 61 in FIG. 6b.

FIG. 6c shows an apparatus for reading an inscribed disc 1, which apparatus is generally combined with that of FIG. 6b. The apparatus again comprises a laser 15, whose beam 16 is projected onto the disc 1 via a mirror 17 and the optic 18. The reflected beam 60 is detected with a photodiode 27 and the resulting electric signal is passed through a band-pass filter 28 having a pass frequency fo and a phase-locked loop 29 tuned to the frequency fo, so that the clock signal of the frequency fo (or 2 fo) is available on output 31. The information recorded on the disc is decoded from the electric signal supplied by the photodiode 27 by means of the read circuit 30, so that on an output 32 thereof the digital information and the information contained in the synchronization areas 8 is available. This read circuit is synchronized by means of the clock signal on output 31. In addition a tracking signal may be derived from the beam detected by a photodiode 27 by means of a tracking circuit 33, in order to control the mirror 17 in such a way that the beam 16 exactly follows the track 4. The disc drive motor 21 may be included in a servo control, for example comprising a tachogenerator 22, a reference source 24, and a servo amplifier 23, in order to control the speed, which control may be locked to the read circuit 30. Furthermore, the apparatus also comprises a control mechanism 35 for moving the optic 18 together with the mirror 17 and the detector 27—the complete mechanism being designated 36 in FIG. 6c—in a radial direction, so that at option a specific part of the disc can be read, controlled by information applied to an input 37 of the control mechanism 35 and by the information produced by the synchronization areas and available on output 32 of the read circuit 30.

Figures 7A, 7B:
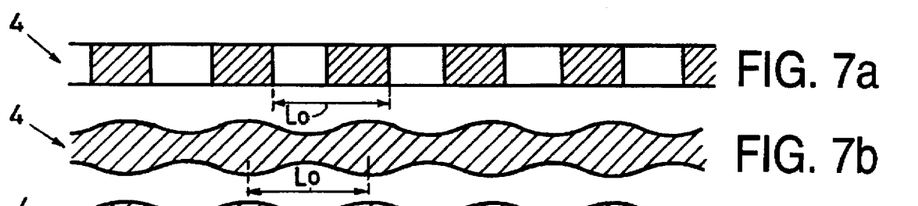
FIG. 7 shows a number of examples of a periodic track modulation in accordance with the invention.

The clock information structure which is or has been recorded in track 4, may take various forms. FIG. 7 shows a number of examples thereof. FIG. 7a schematically represents a track 4 in which the clock information is formed by a height variation—symbolically represented by the interrupted hatching—for example by modulating the intensity of the laser beam that writes the track 4. FIG. 7b shows the track 4 in which the clock information is formed as a width variation of the track 4, for example by modulation of the laser-beam focussing, for which for example the objective 18 (FIG. 6a) may be controlled by means of the device 59

Figure 7C:
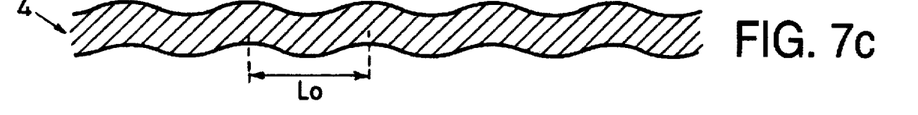

(FIG. 6a). A combination of width and depth variations is also possible, which in practice will frequently be the case when the intensity or focussing of the laser beam is modulated FIG. 7c shows the track 4 in which the clock information takes the form of a radial variation of the position of the track 4, for which purpose for example the angle of the mirror 17 (FIG. 6c) relative to the beam 16 can be modulated by means of the device 58. All the variations shown then have a period length Lo which is equal to Lo=V/f, where V is the tangential speed of the disc 1 at said location and f the a frequency of the desired clock signal, which frequency f corresponds to a zero point in the random frequency spectrum of the data to be recorded, for example the frequency fo (FIGS. 4c and 5c) in the case of "quadphase" modulation.

One of the possibilities of obtaining a tracking signal is by providing a radial "wobble" in the groove-shaped track, for example by controlling the mirror 17 (FIG. 6a), i.e. for example by sinusoidally varying radial excursion with a wavelength on the disc which during play-back at the normal speed produces a light intensity variation detected by the detector 27 (FIG. 6), whose frequency is situated beyond the spectrum of the data, i.e. for example below the frequency 0.2 fo (FIG. 4).

Figure 7D:
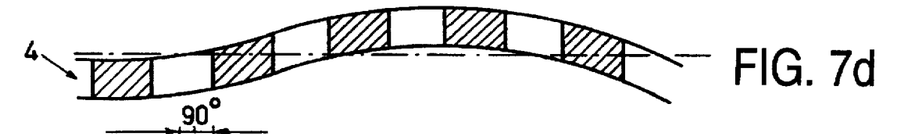

For example, by synchronous detection, a measure of the deviation of the center of the detector relative to the center of the track 4 may be derived from said signal component. Such a radial wobble may be combined with a clock modulation structure, for example the clock modulation structure shown in FIG. 7a, which combination is shown in FIG. 7d. A special combination is obtained when the wobble on the disc has a wavelength equal to that of the clock modulation structure with a fixed phase relationship, which makes synchronous detection superfluous.

Figures 7E, 7F:
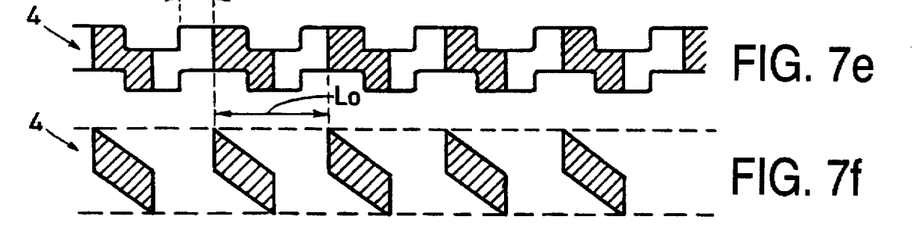

FIG. 7e shows such a structure, a depth modulation structure (represented by alternately hatched and non-hatched areas) in track 4 being combined with a radial positional variation which is 90° shifted relative thereto (i.e. a quarter of the period of said structure). This structure can be produced with the apparatus of FIG. 6a by modulating the angle of the mirror 17 relative to the beam 16 with the aid of the device 58. If the depth modulation structure is then selected so that the "shallow" parts of these modulations coincide with the surface of the disc-shaped record carrier 1, the servo track 4 will take the form of a sequence of radially asymmetrical pits which are tangentially spaced from each other by distances equal to the distance Lo. FIG. 7f shows an example of such a track 4.

Figure 8A:
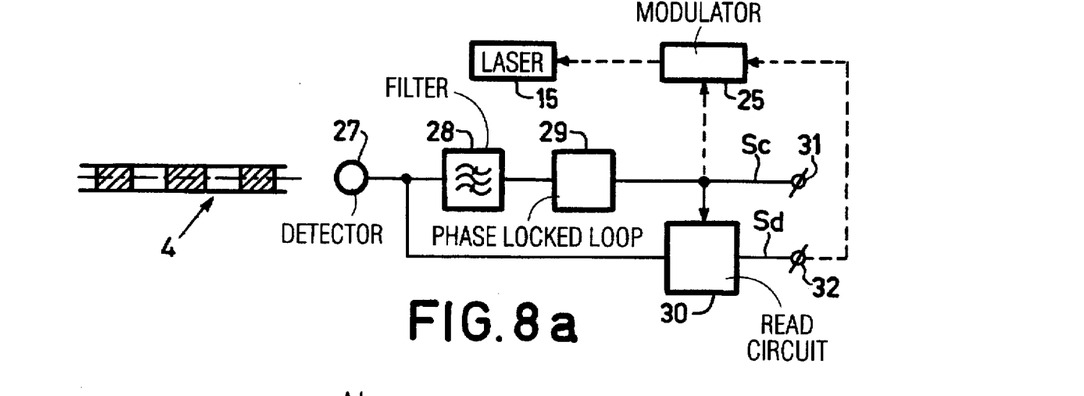
FIG. 8a illustrates the principle of a read section of an apparatus for reading and/or recording a digital signal on a record carrier in accordance with the invention, FIG. 8b representing the frequency spectrum of the signal detected by the detector 27.
Figure 8B:
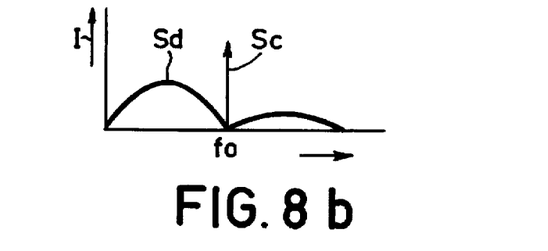

FIG. 8a illustrates the principle of the read section of an apparatus for writing data in or reading data from a record carrier in accordance with the invention, the frequency spectrum of the signal I detected by the detector 27 being shown in FIG. 8b. The apparatus comprises a photodetector 37, along which the track 4 is passed. The signal which is supplied by the detector 27 has a spectrum shown in FIG. 8b in the present example with the spectrum of a quadphase modulated signal Sd and a clock signal Sc. The clock signal Sc is extracted with the aid of a band-pass filter 28, preferably followed by a phase-locked loop 29. The clock signal Sc is available on output 31. The digital signal Sd, i.e. the signal recorded in the synchronization area 8 and during reading the signal recorded in the synchronization area 8 and in the information area 9, is detected with a read circuit 30 which is synchronized with the clock signal Sc. The data signal read is available on output 32. Furthermore, a radial tracking signal can be derived from the signal provided by detector 27. When information is recorded in information areas 9, circuit 30 only detects the information contained in the synchronization areas 8, which together with the clock signal Sc is then applied to the write circuit 25 in order to modulate the beam of a write laser 15.

Figure 9A:
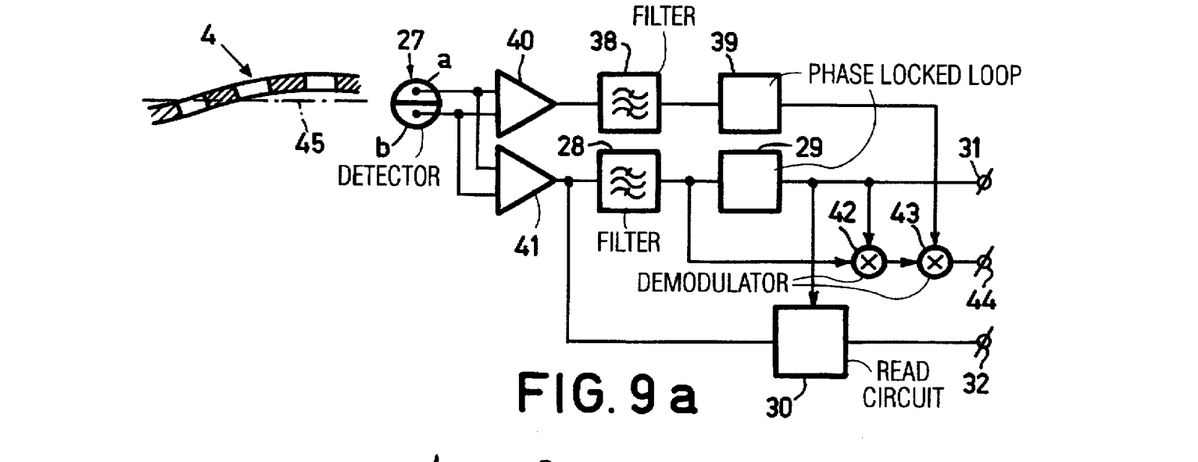
FIG. 9a shows an apparatus in accordance with FIG. 8a, which is also suitable for generating a radial tracking signal, FIG. 9b representing the frequency spectrum of the signal detected by the detector 27.
Figure 9B:
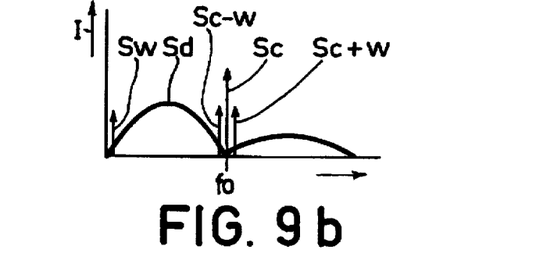

When a low-frequency radial wobble is used in order to obtain a radial tracking signal, the apparatus of FIG. 9a may be used, FIG. 9b showing the frequency spectrum of the signal detected by the detector 27. When a track 4 with a radial wobble is read it is desirable to employ a photodetector 27 which is divided in two sections a and b along an axial line. A differential amplifier 40 or equivalent means forms the difference of the signals detected by sections a and b and a summing amplifier 41 or equivalent means provides the sum of said signals. The frequency spectrum (FIG. 9b) again contains the spectrum of the quadphase modulated signal Sd, the clock signal Sc and the low-frequency signal Sw produced by the wobble. In the sum signal the wobble manifests itself as an amplitude modulation with the clock signal Sc as the carrier, which in FIG. 9b is represented as side bands Sc−w and Sc+w. The side bands have an amplitude equal to zero when the detector 27 exactly follows their center 45 of the track 4. Filtering the sum signal with the band-pass filter 28 yields the clock signal Sc and, if the filter is not too-narrow-banded, also the side bands. The output signal of the band-pass filter 28 is applied to the phase-locked loop 29 and on an output 31 thereof the clock signal Sc is available. The output signal of this band-pass filter 28 is also applied to a synchronous demodulator 42 together with the clock signal Sc. This demodulator then produces the modulation Sw.

The frequency of the radial wobble is recovered from the difference signal from amplifier 40 with the aid of band-pass filter 38 and phase-locked loop 39, which frequency together with the output signal of the synchronous detector 42 is applied to a synchronous detector 43. On the output 44 thereof the modulation of the wobble signal Sw is then available, which may be used as radial tracking signal and is representative of the deviation of the detector 4 relative to the centre of the track 4, which in FIG. 9a is represented by the dashed line 45. The radial tracking signal can then be used to control the mirror 17, as symbolically represented in FIGS. 6b and 6c.

The data contained in the track 4 is then recovered from the sum signal on the output of amplifier 41 in a similar way as in the apparatus of FIG. 8a. In respect of information recording similar steps may be applied as in the apparatus of FIG. 8a, which also valid for the apparatus of FIG. 10, FIG. 11a and FIG. 12.

Figure 10:
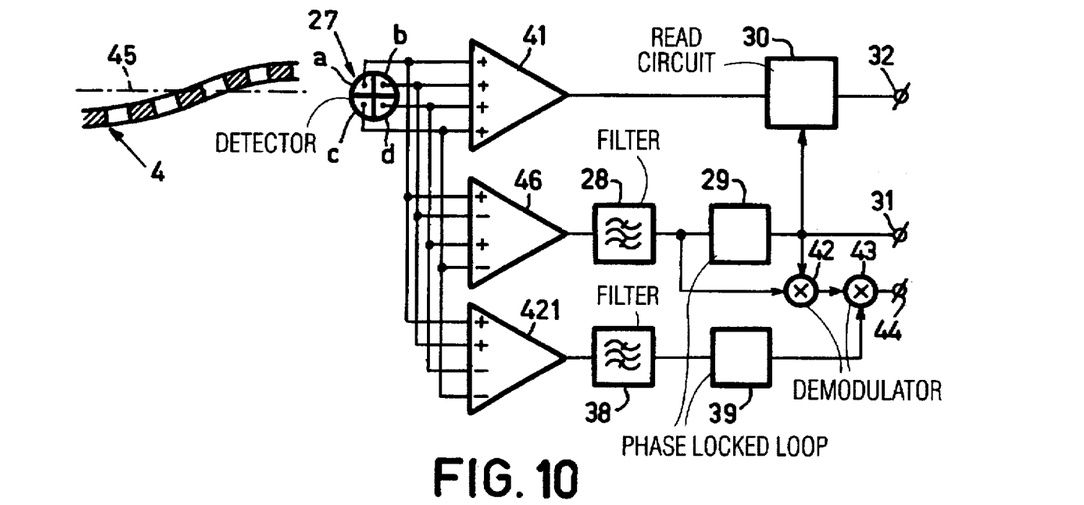

FIG. 10 shows a variant of the apparatus in accordance with FIG. 9, which yields a better signal separation. The detector 27 has also been divided in accordance with a tangential line, so that four quadrants a, b, c and d are obtained, the sections a, b and c, d respectively being situated on either side of the tangential line, and the sections a, b and c, d respectively being situated on either side of the radial line. An amplifier 41 or equivalent means determines the sum of the signals generated by the sections a, b, c and d, so that this amplifier is specifically sensitive to intensity variations of the beam reflected by the track 4, i.e. to the data signal Sd, an amplifier 421 determines the difference between the sections a+b and c+d situated on either side of the tangential line, so that said amplifier 421 is particularly sensitive to variations of the track 4 in a tangential direction, i.e. to the clock signal Sc, and an amplifier 46 determines the difference between the sections a+c and b+d situated on either side of the radial line, so that this amplifier is particularly sensitive to variations of the track 4 in a radial direction, i.e. to the signal Sw corresponding to the wobble.

In a similar way as in the apparatus of FIG. 9a the clock signal Sc is recovered from the output signal of amplifier 46 by means of band-pass filter 28 and phase-locked loop 29 and the frequency of the wobble signal Sw by means of band-pass filter 38 and phase-locked loop 39. The output signal of the band-pass filter 28, which contains the wobble signal Sw as an amplitude modulation of the clock signal Sc, is detected synchronously with the clock signal by means of synchronous detector 42 and yields the wobble signal Sw whose amplitude variation represents the deviation of the detector 27 relative to the centre 45 of track 4. Said signal Sw is detected synchronously with the output signal of phase-locked loop 39, i.e. the wobble frequencies, by means of synchronous detector 43, so that the radial tracking signal appears on output 44. The data signal is recovered from the output signal of amplifier 41, synchronised by the clock signal Sc, by means of the read circuit 30.

Mathemstically, the operation of the apparatus of FIGS. 9a and 10 in respect of the recovery of the radial tracking signal may be explained as follows. The signal I detected by the detector 27 is a product of the clock modulation, the wobble modulation and the radial tracking error, which (when ignoring the data signal) may be expressed as:

$$I = Ar \sin(w_w t) \sin(w_c t)$$

where Ar is a function of the tracking error, $w_w$ the angular frequency of the wobble signal Sw, $w_c$ is the angular frequency of the pilot signal expressed as: Sc, and t the time. Synchronous detection with the pilot signal Sc yields the term $Ar \sin(w_w t)$ and subsequent synchronous detection with the wobble frequency $w_w$ yields the signal Ar.

Figure 11A:
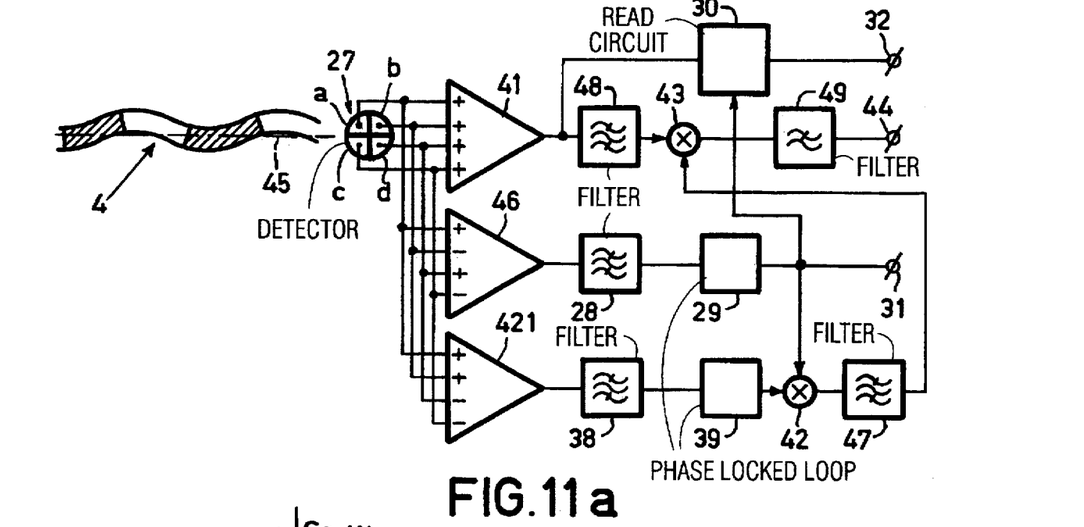
FIG. 11a shows an apparatus in accordance with FIG. 9a adapted to a record carrier with a radial track modulation of substantially the same period as the periodic track modulation, FIG. 11b representing the frequency spectrum of the signal detected by the detector 27.

FIG. 11a shows a read section of an apparatus for reading data from a track 4 with a clock modulation structure and a wobble for deriving a radial tracking signal, the frequency of the wobble signal Sw being substantially equal to the frequency of the clock signal Sc. FIG. 11b shows the frequency spectrum in which Sd represents the data signal and Sc-w the term having a frequency equal to the difference between the frequencies of the clock signal Sc and the wobble signal Sw, which difference is for example 30 kHz, said term being obtained in that the photodiode 27 receives the product of the wobble modulation and the clock modulation. As a result of this, said term is situated in the low-frequency part of the spectrum and is hardly disturbed by the digital information. The amplitude of this term constitutes the radial tracking signal. The amplitude is zero if the centre line 45 of the track is followed exactly. The wobble then yields a term of double the difference frequencies, which term is not used, and a term with the wobble frequency itself.

The apparatus, in a similar way as the apparatus of FIG. 10, comprises an amplifier 41 for supplying the sum of the signals supplied by sections a, b, c and d of photodiode 27, from which sum the term of said difference frequency is extracted by means of the band-pass filter 48. With the aid of a synchronous detector 43, to which said difference frequency is applied, this term is demodulated and, as the case may be via a low-pass filter 49, the radial tracking signal appears on output 44.

The clock signal Sc is obtained in a similar way as in the apparatus of FIG. 10 by determining the difference between the signals supplied by the two radial havles a+c and b+d of photodiode 27 with amplifier 46 and applying said difference to a phase-locked loop 29 after filtration with band-pass filter 28. In a similar way as in the apparatus of FIG. 10 the wobble signal Sw is derived by determining the difference between the signals supplied by the two axial halves a+b and c+d of photodiode 27 with amplifier 421 and applying this to a phase-locked loop 39 via a band-pass filter 38. The difference frequency applied to the read circuit detector 43 is obtained by applying the clock signal $S_c$ thus obtained and the wobble signal Sw to a synchronous detector 42, after which the resulting signal of said difference frequency is applied to synchronous detector 43 via band-pass filter 47.

With the read circuit 30, synchronized with the clock signal Sc, the data signal can be recovered from the output signal of amplifier 41.

If the frequency of the wobble signal Sw is selected to equal the frequency of the clock signal, it will be evident from FIG. 11b that the term with the difference frequency directly constitutes the DC tracking signal. This tracking signal can then be obtained without synchronous detection.

The phase difference between the two track modulations should be unequal to zero, because only one modulation can be distinguished when the two modulations are in phase. It is found that 90° is an optimum phase difference.

Figure 12:
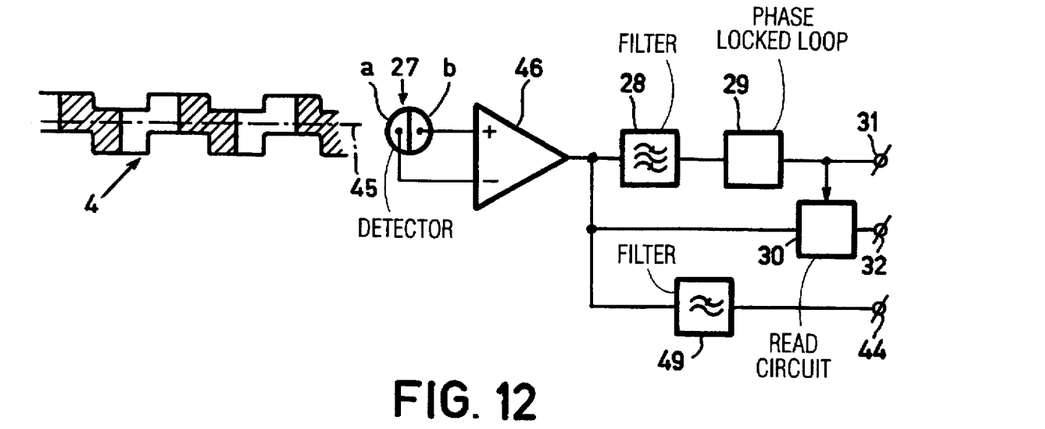
FIG. 12 shows an apparatus adapted to a record carrier with a radial track modulation of the same period as the periodic track modulation.

FIGS. 7e and 7d show such a structure, which can be read with the simple read circuit of FIG. 12.

In the apparatus of FIG. 12 the photodiode 27 is divided into two radial halves a and b for an optimum detection of the clock signal Sc, which is obtained on output 31 by determining the difference between the signals supplied by the two halves a and b with amplifier 46, by filtering said signal with band-pass filter 28 and applying it to the phase-locked loop 29. By filtering the output signal of amplifier 46 with a low-pass filter 49 the radial tracking signal is directly available on output 44. The digital signal is recovered from the difference signal with read circuit 30, which is synchronized with the clock signal So. Alternatively, it is possible to recover the data signal and the low-frequency tracking signal from the sum of the two halves.

In respect of the tracking during the recording of data signals the apparatus in accordance with FIGS. 8a through 12 may be extended with a device modulating a laser beam 16, which device is synchronized with the clock signal Sc and the signal read from the synchronization areas, as has been explained with reference to FIG. 6b.

Figure 13:
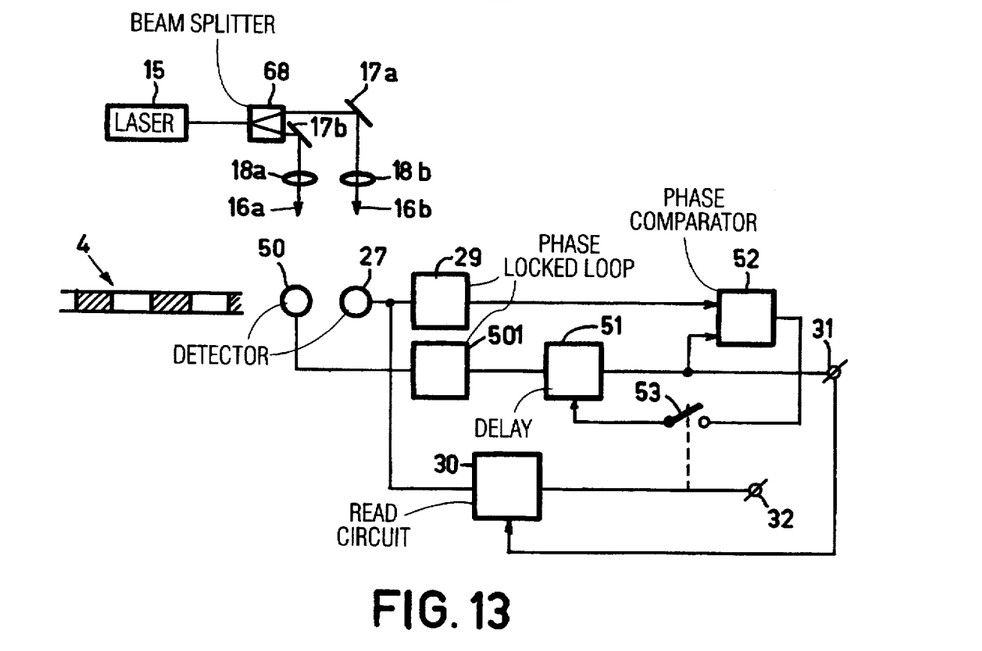
FIG. 13 shows a part of an apparatus for recording an information signal on a record carrier in accordance with the invention for generating a clock signal during recording, use being made of an auxiliary laser beam.

In the foregoing it has been assumed that one detector 27 is used which detects the reflected beam 16 (FIG. 6). Especially at high bit frequencies it may be problematic, when recording data in the information areas 9 with a laser beam which is comparatively powerful relative to that used for reading, to recover the clock information from the beam which is reflected between every two write pulses. As in many cases a follower laser-beam is employed in order to enable the recorded data signal to be detected, the apparatus of FIG. 13 may be used in such cases, in which the track 4, which relative to the detector 27 travels in the direction of the arrow 63, is scanned by an information-writing beam 16a and a follower beam 16b, which beams can for example be obtained by means of a beam splitter 68, mirrors 70a and 70b and optical systems 18a and 18b. In order to modulate the beam 16a, a modulator may be arranged in the beam 16a. Said apparatus comprises a photodiode 27, which in respect of the reading of data signals and tracking signals fully corresponds to the apparatus in accordance with any of the FIGS. 8a, 9a, 10, 11a or 12a. Furthermore, the apparatus comprises a photodiode 50 for detecting the reflection of the follower beam 16b which is projected at the track at some distance behind the beam 16a. During the read process and also when the synchronization areas 8 are being read, the clock signal Sc is obtained by applying the signal detected by photodiode 27 to the phase-looked loop 29 via an amplifier which for simplicity is not shown in this Figure (for example 46 in FIG. 11a) and a band-pass filter (for example 28 in FIG. 11a). In addition, in particular during the writing process, said clock signal is also recovered in a similar way from the signal detected by photodiode 50, as the case may be via a band-pass filter not shown and via a phase-locked loop 501, but this signal 27, is delayed relative to the clock signal obtained via photodiode Via a delay device 51 the output signal is applied to output 31. The phase of the delayed clock signal is then compared with the phase of the clock signal obtained by means of the photodiode 27 in phase comparator 52 and via switch 53 the delay device 51 is adjusted so that the clock signal from photodiode 50, which has been delayed via delay device 51, is in phase with the signal obtained via photodiode 27. During the read-out of the synchronization areas 8 switch 53 is closed and the delay device 51 is adjusted so that the clock signal from photodiode 50, which has been delayed by said delay device 51, is in phase with the clock signal obtained via photodiode 27. During the recording of data in the information areas 9 switch 53 is open and the clock signal is recovered from the reflected auxiliary beam 16b via photodiode 50 and is delayed with the delay device 51 by the time adjusted during the read-out of the synchronization areas 8. The switch 53 is operated on command of the synchronization signals read from the synchronization areas by the read circuit 30.

In this respect it is to be noted that writing information with unit pits, i.e. the information is recorded with separately detectable changes in the surface structure of the record carrier, as shown in FIG. 3f, yields a frequency component at the frequency 2 fo in the spectrum (FIG. 4) of the signal being read. This need not be a problem for the use of a clock modulation structure, because this clock modulation, if it has a frequency equal to 2 fo, may be used when recording information, and if during recording a correct phase relationship with the clock signal is maintained during read-out it will coincide with the component 2 fo as a result of the use of unit pits. When quadphase modulation is used (FIGS. 4c and 5c) the clock signal will have a frequency equal to fo and in that case said component of the frequency 2 fo is not disturbing.

The invention is not limited to the embodiments shown, which relate to a data storage medium with a subdivision into sectors. The invention may also be used in prepared record carriers for the storage of digitally coded audio, video and other information in more or less continuous information areas.

Furthermore, the invention is not limited to record carriers in which the recorded information is detected via reflection of the laser beam, but may also be employed in record carriers where the recorded information is detected by detecting the radiation transmitted by the record carrier.

Although the description with reference to the Figures is based on the use of laser beams, it is alternatively possible, in particular during reading, to employ focussed non-coherent light beams.

What is claimed is:

1. An apparatus for recording on a record carrier a digitally coded signal having a bit frequency and a power spectrum with a substantially zero level at a predetermined frequency, the record carrier having a series of substantially parallel elongated tracks which are pre-recorded with a servo control track structure, which structure comprises periodic variations which, when scanned by a beam of radiation, produce radiation from said tracks which is modulated at a modulation frequency equal to said predetermined frequency, said record carrier further having a radiation-sensitive layer on said tracks which extends over said periodic variations therein; said apparatus comprising beam producing means which includes means for producing a single write beam of radiation and means for directing said write beam onto said record carrier;

means for producing relative movement between said write beam and said record carrier so as to scan said tracks;

means for modulating said write beam in dependence on the digitally coded signal so that, during said relative movement, said write beam records said digitally coded signal in said tracks by modifying said radiation-sensitive layer thereon and thereby writing over said periodic variations;

detecting means for detecting radiation coming from said tracks which has been modulated by said variations, said detecting means producing a photodetection signal representative of the modulation of the detected radiation;

means for extracting from said photodetection signal a component thereof produced by said servo control track structure; and means for applying said component of the photodetection signal to said modulating means for synchronizing the modulation of said write beam with said component.

2. The apparatus according to claim 1, wherein said beam producing means further includes means for producing an auxiliary beam of radiation and means for directing said auxiliary beam onto said record carrier; said auxiliary beam being spaced from and following said write beam, whereby said auxiliary beam is modulated (i) by information recorded on said record carrier by said write beam, and (ii) by said periodic track variations.

3. The apparatus according to claim 1, wherein said component of the photodetection signal is a clock signal having said bit frequency.

4. The apparatus according to claim 1, wherein said means for producing relative movement is controlled by said component of the photodetection signal so as to maintain a predetermined scanning speed of said tracks.

5. The apparatus according to claim 1, wherein said component of the photodetection signal is a servo control signal corresponding to the servo control track structure.

* * * * *